UNITED STATES PATENT OFFICE.

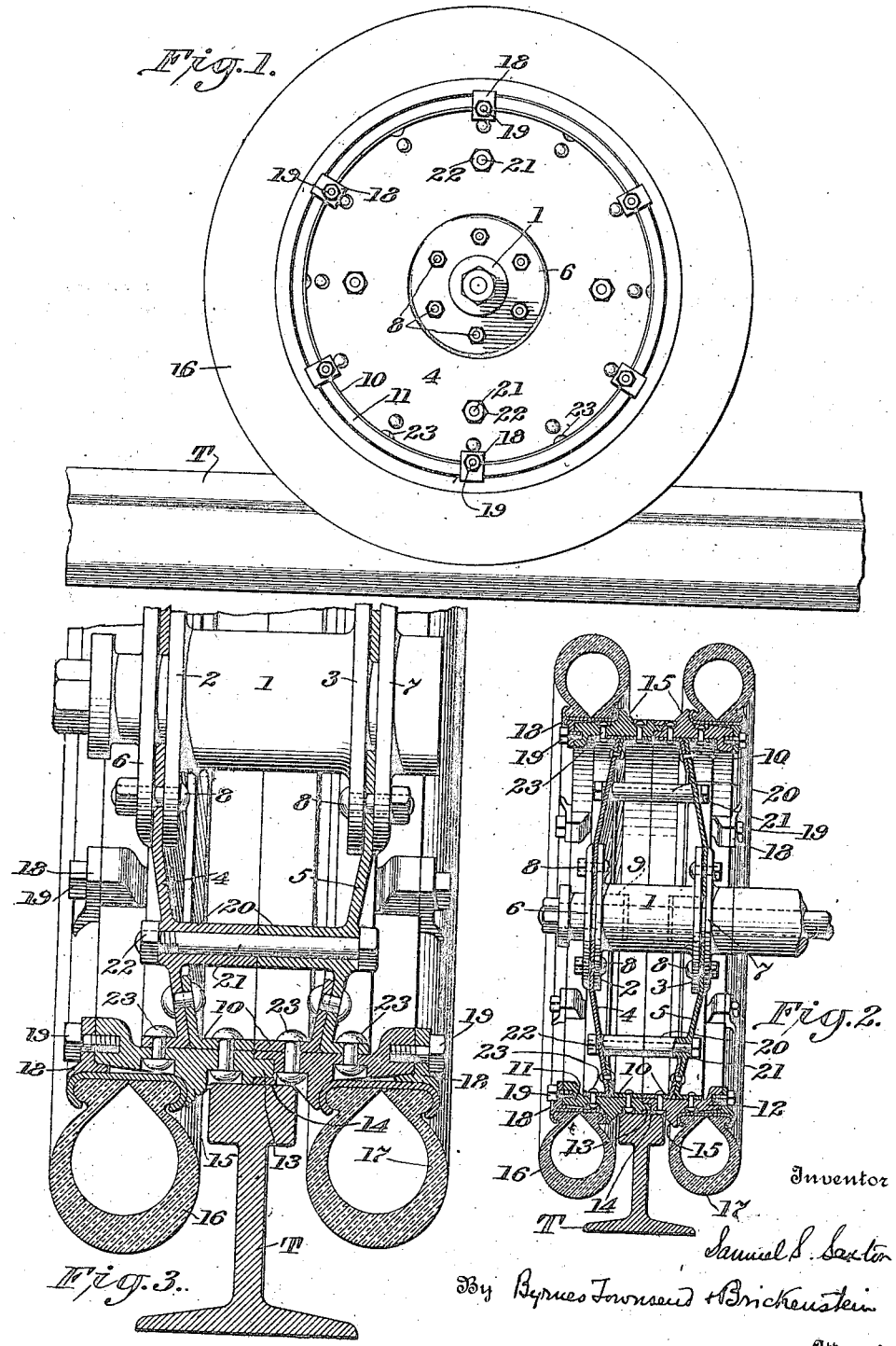

SAMUEL S. SAXTON, OF CHICAGO, ILLINOIS.

ROAD AND RAIL WHEEL.

1,372,910.  Specification of Letters Patent.  Patented Mar. 29, 1921.

Application filed January 17, 1918. Serial No. 212,216.

*To all whom it may concern:*

Be it known that I, SAMUEL S. SAXTON, a citizen of the United States, residing at Chicago, in the county of Cook and State of Illinois, have invented certain new and useful Improvements in Road and Rail Wheels, of which the following is a specification.

This invention relates to convertible road and track vehicle wheels, and broadly stated the object of the invention is to make provision for this vehicle wheel to travel on T rails embedded in concrete foundation on streets, avenues, highways, roads, alleys or lanes, so that the vehicle may be run from the ordinary road or paved road onto this T rail or track and from the T rail onto an ordinary or paved road whenever desired like any ordinary automobile vehicle or truck for loading or unloading freight or passengers at any point whatsoever; and more specifically the object of this invention is to enable the change from track to road or vice versa without recourse to a change of wheels or alterations of any part or parts of the wheel.

The advantages of my invention will be readily apparent. Thus, freight, express or passenger vehicles can be carried on these T rails at high speed with less fuel and less wear on parts than when the vehicles are run on ordinary roads and paved roads, and at the terminus of the trip passengers or freight can be delivered directly to residences, hotels, warehouses, or wherever necessary.

This track and road transportation avoids rehandling of goods and passengers at both the points of starting and ending of the trip. This eliminates the time of labor incident to two rehandlings, the danger of breakage, and enables collections and transportation of goods and passengers with convenience to the patrons and saving of time, fuel and wear, both to the vehicle and to the roads and paved highways traveled.

To accomplish these objects the vehicle is provided with flanged wheels of the usual type designed to run on the ordinary rails of a track, only that the flat bearing of the wheels is divided in the middle and a flange is placed on either side. On each side of each flange an ordinary pneumatic or hard rubber automobile tire is clamped to the outer edge of each flange, clamping both the tires and the steel flanged wheel together. As the periphery of the pneumatic or hard rubber tires is below the flat surface of the flanged wheel, this wheel travels on the T rails with the pneumatic or hard rubber tires free, but at all intersections of roads, streets, lanes, highways or alleys the concrete road-bed carrying the T rails will be built nearly flush with the top of T rails to enable the vehicle traveling on the rails to turn off at any of these intersections or remain on the aforesaid rails.

In the accompanying drawings illustrating the invention, in the several figures of which like parts are similarly designated—

Figure 1 is a side elevation of a wheel such as I prefer to use on the vehicles of my invention and showing a portion of the track.

Fig. 2 is a central vertical section of the same.

Fig. 3 is a fragmentary sectional view of the lower portion of the wheel as shown in Fig. 2 but on a larger scale.

The wheel of my invention comprises a hub member 1 having flanges 2 and 3 to which are applied disks 4 and 5 respectively, and these disks are held in fixed relation to the hub by flanged members 6 and 7 respectively, and bolts 8 and nuts, or the like, which pass through them and through the flanges 2 and 3 and the flanged members 6 and 7. The flanged members 6 and 7 are, moreover, provided with sleeves 9 adapted to enter recesses in the hub member to make a more secure union between the parts, and to assist in properly centering them.

Each of the disks 4 and 5 is provided at its periphery with a seat 10 to which are attached annular tire supporting members 11 and 12 respectively, and these members are provided at intervals around their circumferences with dowel pins 13, or other suitable interengaging devices for the purpose of holding the two members in proper relative position. The meeting portions of the members 11 and 12 form a tread portion 14 adapted to travel upon a railroad rail, and this tread is provided at its sides with guide flanges 15 which serve also as abutments for retaining the rims of suitable demountable pneumatic or other tires adapted for travel upon a highway. I prefer to use two such tires 16 and 17 upon the outside and inside of the tread portion 14 respectively, the outside tire 16 being of greater diameter than the inside tire 17, so that when the vehicle is traveling upon the ordinary highway the load will be upon one set of tires only, namely the outside set, and the inside set will come into play only upon the occurrence of unusual shocks or loads. These tires are held upon the wheel by means of lugs 18 and nuts and studs or bolts 19 as is customary in the mounting of demountable tires upon automobile wheels.

In order to insure at all times the proper and secure union of the two members which form the tread portion 14, I provide at intervals around the disks 4 and 5 spacing devices 20 through which pass bolts 21 provided with nuts 22 so that the disks may be securely clamped together at a distance from the hub where they would be subjected to a severe spreading strain.

It will be obvious that this wheel, in addition to being removable from the axle of the vehicle, and having demountable tires, is separable, and if the disks or either of them become damaged, the wheel may be taken apart by removal of the various bolts 8 and nuts by which the hub flanges 2 and 3, flanged members 6 and 7, and disks 4 and 5 are united, and by removing the bolts 21 and nuts 22, and a new disk substituted. The tread members 11 and 12 may be discarded with the injured disk, or they may be removed therefrom by cutting out their attaching rivets 23, whereupon they may be riveted to a fresh disk. In place of the rivets 23, bolts and nuts may be used, but by using rivets I insure a more permanent union between the disks 4 and 5 and the members 11 and 12.

The construction of the wheels moreover is such that in case of damage to a tire, it is not necessary to jack up the vehicle, since it can simply be run up on a piece of wood or other material of suitable height and the tire replaced; or one section of the wheel can be entirely removed in case of necessity.

I claim:—

1. A vehicle wheel comprising two annular supporting members, each having thereon parts coöperating to form a rigid tread, and also having tire bearing flanges to one side of the rigid tread-forming part, resilient tires secured to said flanges, each of such tires being of greater diameter than the rigid tread, and means for securing together the annular supporting members.

2. A vehicle wheel comprising two annular supporting members, each having thereon parts coöperating to form a rigid tread, and also having tire bearing flanges to one side of the rigid tread-forming part, resilient tires of different diameters secured to said flanges, each of such tires being of greater diameter than the rigid tread, and means for securing together the annular supporting members.

3. A vehicle wheel comprising two annular supporting members, each having thereon parts coöperating to form a rigid tread, and also having tire bearing flanges to one side of the rigid tread-forming part, interengaging devices on said members, resilient tires secured to said flanges, each of such tires being of greater diameter than the rigid tread, and means for securing together the annular supporting members.

In testimony whereof I affix my signature.

SAMUEL S. SAXTON.